US006727319B2

(12) United States Patent
Eichenauer

(10) Patent No.: US 6,727,319 B2
(45) Date of Patent: Apr. 27, 2004

(54) ABS COMPOSITIONS HAVING IMPROVED COMBINATIONS OF PROPERTIES

(75) Inventor: Herbert Eichenauer, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 41 days.

(21) Appl. No.: 10/242,991

(22) Filed: Sep. 13, 2002

(65) Prior Publication Data
US 2003/0092837 A1 May 15, 2003

(30) Foreign Application Priority Data
Sep. 17, 2001 (DE) .......................... 101 45 773

(51) Int. Cl.$^7$ .............................................. C08L 33/00
(52) U.S. Cl. .............................. 525/66; 525/67; 525/71
(58) Field of Search ................................ 525/66, 67, 71

(56) References Cited

U.S. PATENT DOCUMENTS

| 4,009,226 A | 2/1977 | Ott et al. ................. 260/876 R |
| 4,181,788 A | 1/1980 | Wingler et al. ................ 526/68 |
| 4,233,409 A | 11/1980 | Bulkley ........................ 525/71 |
| 4,430,478 A | 2/1984 | Schmitt et al. ................ 525/71 |
| 4,713,420 A | 12/1987 | Henton ........................ 525/236 |
| 4,874,815 A | 10/1989 | Bubeck et al. ................. 525/71 |
| 5,041,498 A | 8/1991 | Hare et al. .................... 525/71 |
| 5,236,911 A | * 8/1993 | Koyama et al. ............... 525/71 |
| 5,270,387 A | 12/1993 | Sheilds et al. ................. 525/71 |
| 5,605,963 A | 2/1997 | Leitz et al. .................... 525/71 |
| 5,696,204 A | 12/1997 | Eichenauer et al. ........... 525/64 |
| 5,708,079 A | 1/1998 | Eichenauer et al. ........... 525/71 |
| 5,883,190 A | 3/1999 | Eichenauer ................... 525/71 |
| 2003/0027898 A1 | 2/2003 | Eichenauer et al. ......... 523/220 |

FOREIGN PATENT DOCUMENTS

| DE | 100 08 420 | 8/2001 |
| EP | 0 390 781 | 3/1996 |

* cited by examiner

Primary Examiner—Jeffrey Mullis
(74) Attorney, Agent, or Firm—Joseph C. Gil; Aron Preis

(57) ABSTRACT

A thermoplastic molding composition having an improved profile of properties is disclosed. The composition contains A) a graft rubber that is a product of free-radical emulsion polymerization of vinyl monomers in the presence of rubber a) that is present in latex form and having a glass transition temperature below 0° C., using at least one peroxydisulfate compound as an initiator, and B) a graft rubber that is a product of free-radical emulsion polymerization of vinyl monomers in the presence of at least one rubber b) that is present in latex form and having a glass transition temperature below 0° C., using at least one redox system as an initiator, and C) at least one graft polymer, that is a product of solution, bulk or suspension polymerization of a grafted phase that contains a member selected from the group consisting of styrene and acrylonitrile in a weight ratio of 90:10 to 50:50 therebetween, in the presence of a rubber, and wherein the weight ratio of introduced graft monomers to introduced rubber is 50:50 to 97:3.

24 Claims, No Drawings

ABS COMPOSITIONS HAVING IMPROVED COMBINATIONS OF PROPERTIES

FIELD OF THE INVENTION

This invention relates to thermoplastic molding compositions and more particularly to compositions containing grafted rubber.

BACKGROUND OF THE INVENTION

Large quantities of ABS molding compositions have long been used for the production of moldings of all kinds. The range of properties of these thermoplastic resins here extend from relatively brittle to highly tough.

One specific area of application for ABS molding compositions is the production of moldings having elevated requirements for toughness on exposure to impact and the possibility of purposeful adjustment (gradations between gloss and matt) of surface gloss, for example in the automotive sector or for the production of casing components.

ABS products exhibiting elevated toughness and relatively high surface gloss may be produced using conventional emulsion ABS incorporating large quantities of rubber, but these are associated with disadvantages in other properties, for example modulus of elasticity, heat resistance and thermoplastic flow.

ABS products exhibiting relatively low surface gloss are obtainable, for example, by polymerization using the solution or bulk polymerization process; however, these processes do not give rise to products having elevated toughness at low temperatures.

While isolated improvements may indeed be achieved by blending conventional emulsion grades of ABS with solution or bulk grades of ABS (c.f. for example U.S. Pat. No. 4,430,478), elevated requirements for toughness and flow simultaneously combined with retention of the low surface gloss characteristic of bulk ABS are not fulfilled.

It is also known to blend ABS polymers produced by bulk polymerization with various graft rubber polymers having small and large particle size produced by emulsion polymerization (c.f. for example U.S. Pat. No. 4,430,478, U.S. Pat. No. 4,713,420, EP-A 190 884, EP-A 390 781, EP-A 436 381 and literature cited therein), but the resultant products do not exhibit improved low temperature toughness.

EP-A 845 497 describes a mixture of ABS polymer, obtained by bulk or suspension polymerization, and a specific graft rubber, obtained by emulsion polymerization using two rubber components. The toughness of the molding compositions produced therefrom is, however, often inadequate for the production of moldings exposed to severe stresses.

Apart from the stated mechanical disadvantages, all these described ABS polymers exhibit less than ideal colorability due to their excessive opacity and inadequate inherent color, as a result of which increased quantities of pigments are required to color the molding compositions, which consequently results in further impairment of toughness.

It has now been found that combining at least two special graft rubbers produced by emulsion polymerization with at least one graft polymer produced by solution, bulk or suspension polymerization gives rise to products having a combination of very good toughness, good processability, adjustable surface gloss, good inherent color and reduced opacity.

The present invention provides compositions containing

A) at least one graft rubber produced by free-radical emulsion polymerization of at least one vinyl monomer, preferably of styrene and acrylonitrile in a ratio by weight of 90:10 to 50:50, wherein styrene and/or acrylonitrile may be entirely or partially replaced by α-methylstyrene, methyl methacrylate or N-phenylmaleimide, particularly preferably of styrene and acrylonitrile, in the presence of at least one rubber a) present in latex form and having a glass transition temperature of below 0° C., preferably a butadiene rubber, particularly preferably polybutadiene, present in latex form, using at least one peroxydisulfate compound as initiator, B) at least one graft rubber produced by free-radical emulsion polymerization of at least one vinyl monomer, preferably of styrene and acrylonitrile in a ratio by weight of 90:10 to 50:50, wherein styrene and/or acrylonitrile may be entirely or partially replaced by α-methylstyrene, methyl methacrylate or N-phenylmaleimide, particularly preferably of styrene and acrylonitrile, in the presence of at least one rubber b) present in latex form and having a glass transition temperature of below 0° C., preferably a butadiene rubber, particularly preferably polybutadiene, present in latex form, using at least one redox system as initiator, and C) at least one graft polymer, which is obtainable by solution, bulk or suspension polymerization of styrene and acrylonitrile in a ratio by weight of 90:10 to 50:50, wherein styrene and/or acrylonitrile may be entirely or partially replaced by α-methylstyrene, methyl methacrylate or N-phenylmaleimide, in the presence of a rubber, wherein the rubber contains 0 to 50 wt. % of another copolymerized vinyl monomer and wherein the weight ratio of graft monomers to rubber is 50:50 to 97:3, preferably 70:30 to 95:5.

Preferred compositions according to the invention contain 1 to 50 parts by weight, preferably 2.5 to 45 parts by weight and particularly preferably 5 to 40 parts by weight of the graft rubbers A) and B) produced by free-radical emulsion polymerization methods and 50 to 99 parts by weight, preferably 55 to 97.5 parts by weight and particularly preferably 60 to 95 parts by weight of graft polymer C).

The graft rubbers A) and B) produced by free-radical polymerization methods may here be present in any desired proportions, conventionally in the range from 5 to 95 parts by weight of A) and 95 to 5 parts by weight of B); preferred proportions are 20 to 90 parts by weight of A) and 10 to 80 parts by weight of B), particularly preferred proportions are 30 to 80 parts by weight of A) and 20 to 70 parts by weight of B), very particularly preferred proportions are 40 to 75 parts by weight of A) and 25 to 60 parts by weight of B) (in each case relative to 100 parts by weight of A+B).

The graft rubbers A) and B) preferably have rubber contents of greater than 50 wt. %, particularly preferably of greater than 55 wt. % and very particularly preferably of greater than 58 wt. %; graft polymer C) preferably has rubber contents of 3 to 50 wt. %, particularly preferably of 5 to 30 wt. % and very particularly preferably of 6 to 25 wt. %.

Molding compositions according to the invention may further contain as component D) at least one thermoplastic, rubber-free polymer obtained by polymerizing at least one resin-forming vinyl monomer, preferably styrene and acrylonitrile in a ratio by weight of 90:10 to 50:50, wherein styrene and/or acrylonitrile may be entirely or partially replaced by α-methylstyrene, methyl methacrylate or N-phenylmaleimide.

In the event that a component D) polymer is additionally used, the quantity is up to 100 parts by weight, preferably up to 80 parts by weight and particularly preferably up to 60 parts by weight (in each case relative to 100 parts by weight of A+B+C).

The compositions according to the invention may moreover contain further rubber-free thermoplastic resins not synthesised from vinyl monomers, wherein these thermoplastic resins are optionally used in quantities of up to 1000 parts by weight, preferably of up to 700 parts by weight and particularly preferably of up to 500 parts by weight (in each case relative to 100 parts by weight of A+B+C+D).

Both the rubber a) present in latex form used in the production of graft rubber A) and the rubber b) present in latex form used in the production of graft rubber B) may be present in the form of latices exhibiting a monomodal, bimodal, trimodal or multimodal particle size distribution.

Preferred combinations of graft rubbers A) and B) are those in which at least one of the rubber latices a) and b) used in the production thereof exhibits a bimodal or trimodal particle size distribution.

Particularly preferred combinations of graft rubbers A) and B) are those in which the rubber latex a) used in the production thereof exhibits a monomodal particle size distribution and the rubber latex b) used exhibits a bimodal particle size distribution, or those in which the rubber latex a) used in the production thereof exhibits a monomodal particle size distribution and the rubber latex b) used exhibits a trimodal particle size distribution, or those in which the rubber latex a) used in the production thereof exhibits a bimodal particle size distribution and the rubber latex b) used exhibits a bimodal particle size distribution, or those in which the rubber latex a) used in the production thereof exhibits a bimodal particle size distribution and the rubber latex b) used exhibits a trimodal particle size distribution, or those in which the rubber latex a) used in the production thereof exhibits a bimodal particle size distribution and the rubber latex b) used exhibits a monomodal particle size distribution.

Very particularly preferred combinations of graft rubbers A) and B) are those in which the rubber latex a) used in the production thereof exhibits a monomodal particle size distribution and the rubber latex b) used exhibits a bimodal particle size distribution, or those in which the rubber latex a) used in the production thereof exhibits a bimodal particle size distribution and the rubber latex b) used exhibits a bimodal particle size distribution.

The median particle diameter ($d_{50}$ value) of the monomodal, bimodal, trimodal or multimodal rubber latices a) and b) used in the production of the graft rubbers A) and B) may be varied over wide ranges. Suitable particle diameters are, for example, between 50 and 600 nm, preferably between 80 and 550 nm and particularly preferably between 100 and 500 nm.

The median particle diameters ($d_{50}$) of the rubber latices a) used are preferably smaller than the median particle diameters ($d_{50}$) of the rubber latices b) used, the median particle diameters of the rubber latices a) and b) used particularly preferably differing by at least 40 nm, very particularly preferably differing by at least 80 nm.

Rubbers a) and b) present in latex form which are suitable for the production of the component A) and component B) graft rubbers are in principle any rubber polymers having a glass transition temperature of below 0° C. Examples of such rubber polymers are polydienes, such as for example polybutadiene or polyisoprene, alkyl acrylate rubbers based on $C_1$–$C_8$ alkyl acrylates, such as for example poly-n-butyl acrylate, polysiloxane rubbers, such as for example products based on polydimethylsiloxane.

Preferred rubbers a) and b) for the production of the graft rubbers A) and B) are butadiene polymer latices, which may be produced by emulsion polymerization of butadiene. This polymerization process is known and is described, for example, in Houben-Weyl, Methoden der organischen Chemie, Makromolekulare Stoffe, part 1, p. 674 (1961), Thieme Verlag, Stuttgart. Up to 50 wt. %, preferably up to 30 wt. % (relative to the entire quantity of monomers used for producing the butadiene polymer) of one or more monomers copolymerizable with butadiene may be used as comonomers.

The following may be mentioned by way of preferred examples of such monomers, isoprene, chloroprene, acrylonitrile, styrene, α-methylstyrene, $C_1$–$C_4$ alkylstyrenes, $C_1$–$C_8$ alkyl acrylates, $C_1$–$C_8$ alkyl methacrylates, alkylene glycol diacrylates, alkylene glycol dimethacrylates, divinylbenzene; butadiene is preferably used alone. When producing a) and b), it is also possible initially to produce a finely divided butadiene polymer using known methods and then to agglomerate said polymer in known manner to establish the required particle size. Such techniques have been described (c.f. EP-A 0 029 613; EP-A 0 007 810; DD-A 144 415; DE-A 12 33 131; DE-A 12 58 076; DE-A 21 01 650; U.S. Pat. No. 1,379,391).

The rubber latices a) and b) may, in principle, also be produced by emulsifying finely divided rubber polymers in aqueous media (c.f. JP-A 55-125 102).

Rubber latices a) and b) exhibiting bimodal, trimodal or multimodal particle size distributions are preferably produced by mixing together monomodal rubber latices which have a different median particle size and a narrow particle size distribution.

For the purposes of the invention, monomodal rubber latices having a narrow particle size distribution are taken to mean those latices which exhibit a width of the particle size distribution (measured as $d_{90}$–$d_{10}$ from the overall particle size distribution) of 30 to 150 nm, preferably of 35 to 100 nm and particularly preferably of 40 to 80 nm.

The differences in median particle diameter ($d_{50}$ value from the overall particle size distribution) of the rubber latices used for blending in the preferred production of bimodal, trimodal or multimodal particle size distributions are preferably at least 30 nm, particularly preferably at least 60 nm and very particularly preferably at least 80 nm.

Monomodal rubber latices having a narrow particle size distribution are preferably produced by emulsion polymerization of suitable monomers, preferably monomer mixtures containing butadiene, particularly preferably butadiene, using the so-called seed polymerization technique, in which a finely divided polymer, preferably a rubber polymer, particularly preferably a butadiene polymer, is initially produced as a seed latex and is then further reacted with rubber-forming monomers, preferably with monomers containing butadiene, to yield larger particles (c.f. for example Houben-Weyl, Methoden der organischen Chemie, Makromolekulare Stoffe, part 1, p. 339 (1961), Thieme Verlag, Stuttgart).

The seed-batch process or the seed-feed process is preferably used for this purpose.

The gel contents of the rubber latices a) and b) used for the production of the graft rubbers A) and B) are generally not critical and may be varied within wide ranges. Conventional values are between approx. 30 and 98 wt. %, preferably between and 40 and 95 wt. %.

The gel contents of the rubber latices a) used are preferably greater than the gel contents of the rubber latices b)

used, the gel contents of the rubber latices a) and b) used particularly preferably differing by at least 5%, very particularly preferably by at least 10%.

The gel contents of the rubber latices a) and b) may be adjusted in a manner known in principle by using suitable reaction conditions (for example elevated reaction temperature and/or polymerization up to a high conversion and optional addition of substances having a crosslinking action in order to achieve an elevated gel content or, for example, low reaction temperature and/or termination of the polymerization reaction before excessive crosslinking occurs and optional addition of chain-transfer agent, such as for example n-dodecyl mercaptan or t-dodecyl mercaptan in order to achieve a low gel content). Emulsifiers which may be used are conventional anionic emulsifiers such as alkylsulfates, alkylsulfonates, aralkylsulfonates, soaps of saturated or unsaturated fatty acids and alkaline, disproportionated or hydrogenated abietic or tall oil acids, with emulsifiers having carboxyl groups (for example salts of $C_{10}$–$C_{18}$ fatty acids, disproportionated abietic acid) being preferred. The median particle diameter $d_{50}$ and the $d_{10}$ and $d^{90}$ values may be determined by ultracentrifuge measurements (c.f. W. Scholtan, H. Lange, Kolloid Z. u. Z. Polymere 250, pp. 782–796 (1972)). The stated gel content values relate to determination by the wire cage method in toluene (c.f. Houben-Weyl, Methoden der organischen Chemie, Makromolekulare Stoffe, part 1, p. 307 (1961), Thieme Verlag, Stuttgart). Graft polymerization during the production of the graft rubbers A) and B) may be carried out in such a manner that the monomer mixture is added in portions or continuously to the rubber latex a) or rubber latex b) and polymerized.

Specific monomer to rubber ratios are preferably maintained during this process.

Inorganic per salts, selected from among ammonium peroxydisulfate, potassium peroxydisulfate, sodium peroxydisulfate or mixtures thereof must be used to produce the graft rubber A) according to the invention.

The reaction temperature during the production of the graft rubber A) according to the invention may be varied within broad limits. The temperature is generally 25° C. to 160° C., preferably 40° C. to 100° C. and particularly preferably 50° C. to 90° C., wherein the temperature difference between the beginning and end of the reaction is at least 10° C., preferably at least 15° C. and particularly preferably at least 20° C.

At least one redox system must be used as the initiator for the production of the graft rubber B) according to the invention.

Redox initiator systems suitable according to the invention generally consist of an organic oxidizing agent and a reducing agent, wherein heavy metal ions may additionally be present in the reaction medium; the reaction is preferably performed without heavy metal ions. Preferred examples of organic oxidizing agents which are suitable according to the invention are di-tert.-butyl peroxide, cumene hydroperoxide, dicyclohexyl percarbonate, tert.-butyl hydroperoxide, p-menthane hydroperoxide or mixtures thereof, with cumene hydroperoxide and tert.-butyl hydroperoxide being particularly preferred. $H_2O_2$ may also be used.

Reducing agents which are usable according to the invention are preferably water-soluble compounds having a reducing action, preferably selected from the group consisting of salts of sulfinic acid, salts of sulfurous acid, sodium dithionite, sodium sulfite, sodium hyposulfite, sodium hydrogensulfite, ascorbic acid and the salts thereof, Rongalit®C (sodium formaldehydesulfoxylate), mono- and dihydroxyacetone, sugars (for example glucose or dextrose). It is also possible in principle to use, for example, iron(II) salts, such as for example iron(II) sulfate, tin(II) salts, such as for example tin(II) chloride, titanium(III) salts, such as titanium(III) sulfate; but it is preferred not to use such metal salts.

Particularly preferred reducing agents are dextrose, ascorbic acid (salts) or sodium formaldehydesulfoxylate (Rongalit® C).

The quantity of redox initiator component is divided between the oxidizing and reducing agents as follows:

The quantity of oxidizing agent used is generally 0.05 to 2.0 wt. %, preferably 0.1 to 1.5 wt. % and particularly preferably 0.2 to 1.2 wt. %. The quantity of reducing agent is generally 0.05 to 1.5 wt. %, preferably 0.08 to 1.2 wt. % and particularly preferably 0.1 to 1.0 wt. %.

The redox initiator components are conventionally used in the form of aqueous solutions, aqueous emulsions, aqueous suspensions or other aqueous dispersions.

The reaction temperature during production of the graft rubber B) according to the invention may be varied within broad limits. The temperature is generally 25° C. to 120° C., preferably 35° C. to 100° C. and particularly preferably 40° C. to 85° C., wherein the temperature difference between the beginning and end of the reaction is at least 10° C., preferably at least 15° C. and particularly preferably at least 20° C.

The graft rubber A) according to the invention is produced by polymerizing preferably 20 to 60 parts by weight, particularly preferably 25 to 50 parts by weight, at least one vinyl monomer, preferably a mixture of styrene and acrylonitrile, wherein styrene and/or acrylonitrile may be entirely or partially replaced by α-methylstyrene, methyl methacrylate or N-phenylmaleimide, in the presence of preferably 40 to 80 parts by weight, particularly preferably 50 to 75 parts by weight (in each case relative to solids) of a rubber latex a).

The graft rubber B) according to the invention is produced by polymerizing preferably 25 to 70 parts by weight, particularly preferably 30 to 60 parts by weight, at least one vinyl monomer, preferably a mixture of styrene and acrylonitrile, wherein styrene and/or acrylonitrile may be entirely or partially replaced by α-methylstyrene, methyl methacrylate or N-phenylmaleimide, in the presence of preferably 30 to 75 parts by weight, particularly preferably 40 to 70 parts by weight (in each case relative to solids) of a rubber latex b).

The monomers used in these graft polymerizations are preferably mixtures of styrene and acrylonitrile in a ratio by weight of 90:10 to 50:50, particularly preferably in a ratio by weight of 80:20 to 65:35. Chain-transfer agents may additionally be used in the graft polymerization, preferably in quantities of 0.05 to 2 wt. %, particularly preferably in quantities of 0.1 to 1 wt. % (in each case relative to the total quantity of monomers in the graft polymerization stage).

Suitable chain-transfer agents are, for example, alkyl mercaptans, such as n-dodecyl mercaptan, t-dodecyl mercaptan; dimeric α-methylstyrene; terpinolene.

Production of the graft polymer C) is known (c.f. for example DE-A 1 300 241, DE-A 2 659 175, EP-A 67 536, EP-A 103 657, EP-A 412 801, EP-A 505 798, U.S. Pat. No. 4,252,911, U.S. Pat. Nos. 4,362,850, 5,286,792 and the literature cited in these documents).

For example, styrene and acrylonitrile may be polymerized in a ratio by weight of 90:10 to 50:50, preferably in a ratio by weight of 65:35 to 75:25, wherein styrene and/or acrylonitrile may entirely or partially replaced by copolymerizable monomers, preferably by α-methylstyrene, methyl methacrylate or N-phenylmaleimide, in the presence of a soluble rubber using known solution, bulk or suspension polymerization methods.

Rubbers having a glass transition temperature of ≦10° C. are used; polybutadiene, butadiene/styrene copolymers (for example random copolymers, block copolymers, star copolymers), butadiene/acrylonitrile copolymers and polyisoprene are preferred.

Particularly preferred rubbers for the production of the graft polymer C) are polybutadiene and butadiene/styrene copolymers.

The rubber content of the graft polymer C) according to the invention are 3 to 50 wt. %, preferably 5 to 30 wt. % and particularly preferably 6 to 25 wt. %.

The rubbers are present in the graft polymer C) in the form of rubber phases having median particle diameters of approx. 100 nm to greater than 10000 nm, the ABS polymers used preferably being those having median particle diameters of the rubber phase of 200 nm to 5000 nm, particularly preferably of 400 nm to 2000 nm, in particular of 500 to 1500 nm.

Rubber-free thermoplastics D) which are preferably used are copolymers of styrene and acrylonitrile in a ratio by weight of 95:5 to 50:50, wherein styrene and/or acrylonitrile may be entirely or partially replaced by α-methylstyrene, methyl methacrylate or N-phenylmaleimide. Copolymers D) having contents of incorporated acrylonitrile units of below 30 wt. % are particularly preferred.

These copolymers preferably have weight average molecular weights $\overline{M}_w$ of 20000 to 200000 or intrinsic viscosities [η] of 20 to 110 ml/g (measured in dimethylformamide at 25° C.).

Details relating to the production of these resins are described, for example, in DE-A 2 420 358 and DE-A 2 724 360. Vinyl resins produced by bulk or solution polymerization have proved particularly suitable. The copolymers may be added alone or in any desired mixture.

Apart from thermoplastic resins synthesised from vinyl monomers, it is also possible to use polycondensation products, for example aromatic polycarbonates, aromatic polyester carbonates, polyesters, polyamides, as the rubber-free copolymer in the compositions according to the invention.

Suitable thermoplastic polycarbonates and polyester carbonates are known (c.f. for example DE-A 1 495 626, DE-A 2 232 877, DE-A 2 703 376, DE-A 2 714 544, DE-A 3 000 610, DE-A 3 832 396, DE-A 3 077 934), and may be produced, for example, by reacting diphenols of the formulae (I) and (II)

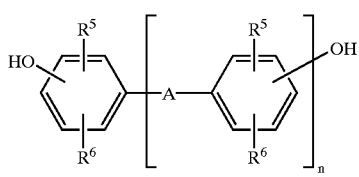

(I)

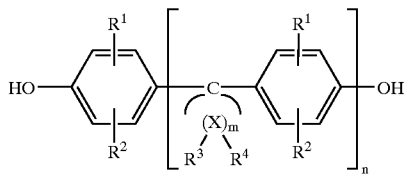

(II)

in which

A is a single bond, $C_1$–$C_5$ alkylene, $C_2$–$C_5$ alkylidene, $C_5$–$C_6$ cycloalkylidene, —O—, —S—, —SO—, —SO$_2$— or —CO—, $R^5$ and $R^6$ mutually independently denote hydrogen, methyl or halogen, in particular hydrogen, methyl, chlorine or bromine, $R^1$ and $R^2$ mutually independently mean hydrogen, halogen, preferably chlorine or bromine, $C_1$–$C_8$ alkyl, preferably methyl, ethyl, $C_5$–$C_6$ cycloalkyl, preferably cyclohexyl, $C_6$–$C_{10}$ aryl, preferably phenyl, or $C_7$–$C_{12}$ aralkyl, preferably phenyl-$C_1$–$C_4$-alkyl, in particular benzyl, m is an integer from 4 to 7, preferably 4 or 5, n is 0 or 1, $R^3$ and $R^4$ are individually selectable for each X and mutually independently mean hydrogen or $C_1$–$C_6$ alkyl and X means carbon, with carbonic acid halides, preferably phosgene, and/or with aromatic dicarboxylic acid dihalides, benzenedicarboxylic acid dihalides, by phase interface polycondensation or with phosgene by homogeneous phase polycondensation (the so-called pyridine process), wherein molecular weight may be adjusted in known manner by an appropriate quantity of known chain terminators.

Suitable diphenols of the formulae (I) and (II) are, for example, hydroquinone, resorcinol, 4,4'-dihydroxydiphenyl, 2,2-bis-(4-hydroxyphenyl)propane, 2,4-bis(4-hydroxyphenyl)-2-methylbutane, 2,2-bis(4-hydroxy-3,5-dimethylphenyl)propane, 2,2-bis(4-hydroxy-3,5-dichlorophenyl)propane, 2,2-bis(4-hydroxy-3,5-dibromophenyl)propane, 1,1-bis(4-hydroxyphenyl) cyclohexane, 1,1-bis(4-hydroxyphenyl)-3,3,5-trimethylcyclohexane, 1,1-bis(4-hydroxyphenyl)-3,3-dimethylcyclohexane, 1,1-bis(4-hydroxyphenyl)-3,3,5,5-tetramethylcyclohexane or 1,1-bis(4-hydroxyphenyl)-2,4,4-trimethylcyclopentane.

Preferred diphenols of the formula (I) are 2,2-bis(4-hydroxyphenyl)propane and 1,1-bis(4-hydroxyphenyl) cyclohexane, while the preferred phenol of the formula (II) is 1,1-bis(4-hydroxyphenyl)-3,3,5-trimethylcyclohexane.

Mixtures of diphenols may also be used.

Suitable chain terminators are, for example, phenol, p-tert.-butylphenol, long-chain alkylphenols, such as 4-(1, 3-tetramethylbutyl)phenol according to DE-A 2 842 005, monoalkylphenols, dialkylphenols having a total of 8 to 20 C atoms in the alkyl substituents according to DE-A 3 506 472, such a p-nonylphenol, 2,4-di-tert.-butyl-phenol, p-tert.-octylphenol, p-dodecylphenol, 2-(3,5-dimethylheptyl) phenol and 4-(3,5-dimethylheptyl)phenol. The required quantity of chain terminators is in general 0.5 to 10 mol %, relative to the sum of diphenols (I) and (II).

Suitable polycarbonates or polyester carbonates may be linear or branched; branched products are preferably obtained by incorporating 0.05 to 2.0 mol %, relative to the sum of introduced diphenols, of trifunctional or greater than trifunctional compounds, for example those having three or more than three phenolic OH groups.

Suitable polycarbonates or polyester carbonates may contain aromatically-attached halogen, preferably bromine and/or chlorine; they are preferably halogen-free.

They have average molecular weights ($\overline{M}_w$, weight average), determined for example by ultracentrifugation or light scattering, of 10000 to 200000, preferably of 20000 to 80000.

Suitable thermoplastic polyesters are preferably polyalkylene terephthalates, i.e. reaction products prepared from aromatic dicarboxylic acids or the reactive derivatives thereof (for example dimethyl esters or anhydrides) and aliphatic, cycloaliphatic or arylaliphatic diols and mixtures of such reaction products.

Preferred polyalkylene terephthalates may be produced from terephthalic acids (or the reactive derivatives thereof) and aliphatic or cycloaliphatic diols having 2 to 10 C atoms using known methods (Kunststoff-Handbuch, volume VIII, pp. 695 et seq., Carl Hanser Verlag, Munich, 1973).

In preferred polyalkylene terephthalates, 80 to 100, preferably 90 to 100 mol % of the dicarboxylic acid residues are terephthalic acid residues and 80 to 100, preferably 90 to 100 mol % of the diol residues are ethylene glycol or 1,4-butanediol residues.

Preferred polyalkylene terephthalates may contain, in addition to ethylene glycol or 1,4-butanediol residues, 0 to 20 mol % of residues of other aliphatic diols having 3 to 12 C atoms or cycloaliphatic diols having 6 to 12 C atoms, for example residues of 1,3-propanediol, 2-ethyl-1,3-propanediol, neopentyl glycol, 1,5-pentanediol, 1,6-hexanediol, 1,4-cyclohexanedimethanol, 3-methyl-1,3-pentanediol, 3-methyl-1,6-pentanediol, 2-ethyl-1,3-hexanediol, 2,2-diethyl-1,3-propanediol, 2,5-hexanediol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(3-β-hydroxyethoxyphenyl) propane and 2,2-bis(4-hydroxypropoxyphenyl)propane (DE-A 2 407 647, 2 407 776, 2 715 932).

The polyalkylene terephthalates may be branched by incorporating relatively small quantities of tri- or tetrahydric alcohols or tri- or tetrabasic carboxylic acids, as are described in DE-A 1 900 270 and U.S. Pat. No. 3,692,744. Examples of preferred branching agents are trimesic acid, trimellitic acid, trimethylolethane, trimethylolpropane and pentaerythritol. It is advisable to use no more than 1 mol % of the branching agent relative to the acid component.

Particularly preferred polyalkylene terephthalates are those which have been produced solely from terephthalic acid and the reactive derivatives thereof (for example the dialkyl esters thereof) and ethylene glycol and/or 1,4-butanediol and mixtures of these polyalkylene terephthalates.

Preferred polyalkylene terephthalates are also copolyesters which are produced from at least two of the above-stated alcohol components: particularly preferred copolyesters are poly(ethylene glycol/1,4-butanediol) terephthalates.

Preferably suitable polyalkylene terephthalates generally have an intrinsic viscosity of 0.4 to 1.5 dl/g, preferably of 0.5 to 1.3 dl/g, in particular of 0.6 to 1.2 dl/g, in each case measured in phenol/o-dichlorobenzene (1:1 parts by weight) at 25° C.

Suitable polyamides are known homopolyamides, copolyamides and mixtures of these polyamides. These may comprise partially crystalline and/or amorphous polyamides.

Suitable partially crystalline polyamides are polyamide 6, polyamide 6,6, mixtures and corresponding copolymers of these components. Further partially crystalline polyamides which may be considered are those having an acid component which consists entirely or in part of terephthalic acid and/or isophthalic acid and/or suberic acid and/or sebacic acid and/or azelaic acid and/or adipic acid and/or cyclohexanedicarboxylic acid, a diamine component which consists entirely or in part of m- and/or p-xylylenediamine and/or hexamethylenediamine and/or 2,2,4-trimethylhexamethylenediamine and/or 2,2,4-trimethylhexamethylenediamine and/or isophoronediamine and the composition of which is known in principle. Further polyamides which may be mentioned are those which are produced entirely or in part from lactams having 7 to 12 C atoms in the ring, optionally together with one or more of the above-stated starting components.

Particularly preferred partially crystalline polyamides are polyamide 6 and polyamide 6,6 and the mixtures thereof. Known products may be used as amorphous polyamides. They are obtained by polycondensation of diamines such as ethylenediamine, hexamethylenediamine, decamethylenediamine, 2,2,4- and/or 2,4,4-trimethylhexamethylenediamine, m- and/or p-xylylenediamine, bis(4-aminocyclohexyl)methane, bis-(4-aminocyclohexyl)propane, 3,3'-dimethyl-4,4'-diaminodicyclohexylmethane, 3-aminomethyl-3,5,5-trimethylcyclohexylamine, 2,5- and/or 2,6-bis (aminomethyl)norbornane and/or 1,4-diaminomethylcyclohexane with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Copolymers which are obtained by polycondensation of two or more monomers are suitable, as are copolymers which are produced in the presence of aminocarboxylic acids such as ε-aminocaproic acid, ω-aminoundecanoic acid or ω-aminolauric acid or the lactams thereof. Particularly suitable amorphous polyamides are the polyamides produced from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis (aminomethyl)norbornene; or from isophthalic acid, 4,4'-diaminodicyclohexylmethane and ε-caprolactam; or from isophthalic acid, 3,3'-dimethyl-4,4'-diaminodicyclohexylmethane and laurolactam; or from terephthalic acid and the isomer mixture of 2,2,4- and/or 2,4,4-trimethylhexamethylenediamine.

Instead of pure 4,4'-diaminodicyclohexylmethane, it is also possible to use mixtures of the positionally isomeric diaminodicyclohexylmethanes which are composed of 70 to 99 mol % of the 4,4'-diamino isomer
1 to 30 mol % of the 2,4'-diamino isomer
0 to 2 mol % of the 2,2'-diamino isomer and optionally correspondingly more highly condensed diamines, which are obtained by hydrogenating technical grade diaminodiphenylmethane. Up to 30% of the isophthalic acid may be replaced by terephthalic acid. The polyamides preferably exhibit a relative viscosity (measured on a 1 wt. % solution in m-cresol at 25° C.) of 2.0 to 5.0, particularly preferably of 2.5 to 4.0.

Additives known in the art for their utility, for example antioxidants, UV stabilizers, peroxide scavengers, antistatic agents, lubricants, mold release agents, flame retardants, fillers or reinforcing materials (glass fibers, carbon fibers etc.), colorants, may be added to the compositions according to the invention during production, working up, further processing and final shaping.

The compositions according to the invention are produced by mixing components A)+B)+C) optionally together with further constituents in conventional mixing units, preferably on multiroll mills, compounding extruders or internal kneaders.

The present invention accordingly also provides a process for the production of the compositions according to the invention, wherein components A)+B)+C) and optionally further constituents are mixed and compounded at elevated temperature, generally at temperatures of 150° C. to 300° C., and extruded.

Final shaping may be carried out in conventional commercial processing units and includes, for example, injection molding, sheet extrusion optionally followed by thermoforming, cold forming, extrusion of tubes and profiles, calendering.

EXAMPLES

In the following Examples, unless otherwise stated, the parts are parts by weight (pbw) and the percentages are weight percentages.

Components Used

A) Graft rubbers produced using peroxydisulfate compounds as initiator:

A1) 70 parts by weight (calculated as solids) of a bimodal polybutadiene latex having an median particle diameter $d_{50}$ of 244 nm (particle size peaks at 196 nm and 291 nm) and a gel content of 66 wt. % are adjusted with water to a solids content of approx. 20 wt. %. The mixture is then heated to 59° C. and combined with 0.45 parts by weight of $K_2S_2O_8$ (dissolved in water). 30 parts by weight of a monomer mixture (ratio by weight of styrene:acrylonitrile=73:27), 0.08 parts by weight tert.-dodecyl mercaptan and 1.0 part by weight (calculated as solid substance) of the sodium salt of a resin acid mixture (Dresinate® 731, Abieta Chemie GmbH, Gersthofen), dissolved in alkalised water, are then apportioned in parallel within 6 hours.

The reaction temperature is raised 80° C. during these 6 hours, whereupon the mixture is post-reacted for 2 hours at this temperature. After addition of approx. 1 part by weight of a phenolic antioxidant, the mixture is coagulated with a magnesium sulfate/acetic acid mixture and the resultant powder dried at 70° C. after being washed with water.

A2) The procedure described in A1) is repeated, wherein 60 parts by weight (calculated as solids) of the polybutadiene latex described in A1), 40 parts by weight of monomer mixture (ratio by weight of styrene:acrylonitrile=73:27) and 0.12 parts by weight of tert.-dodecyl mercaptan are used. The other quantities ($K_2S_2O_8$, sodium salt of a resin acid mixture) and the reaction and working up conditions are unchanged.

B) Graft rubbers produced using redox initiator systems:

B1) 60 parts by weight (calculated as solids) of a bimodal polybutadiene latex having an median particle diameter $d_{50}$ of 355 nm (particle size peaks at 291 nm and 415 nm) and a gel content of 65 wt. % are adjusted with water to a solids content of approx. 20 wt. %. The mixture is then heated to 75° C., whereupon 0.26 parts by weight of tert.-butyl hydroperoxide and 0.22 parts by weight of sodium ascorbate are apportioned in parallel within 8 hours together with 40 parts by weight of a monomer mixture (ratio by weight of styrene:acrylonitrile=73:27) within 4 hours and the temperature is maintained at 75° C. for the first 4 hours and then raised to 80° C.

In parallel with the monomers, 1.72 parts by weight (calculated as solid substance) of the sodium salt of a resin acid mixture (Dresinate® 731, Abieta Chemie GmbH, Gersthofen) are apportioned over 4 hours.

After one hour's post-reaction at 80° C., approx. 1 part by weight of a phenolic antioxidant is added, the mixture coagulated with a magnesium sulfate/acetic acid mixture and the resultant powder dried at 70° C. after being washed with water.

B2) The procedure described in B1) is repeated, wherein 60 parts by weight (calculated as solids) of a trimodal polybutadiene latex having an median particle diameter $d_{50}$ of 298 nm (particle size peaks at 196 nm, 291 nm and 415 nm) and a gel content of 66 wt. % are used. The other quantities (monomers, initiator, emulsifier) and reaction and working up conditions are unchanged.

C) Graft rubbers produced by solution, bulk or suspension polymerization:

C1) Bulk ABS Magnum 3504 (Dow Chemical Europe S. A., Horgen, Switzerland).

Testing of the Molding Compositions

The above-described polymer components are mixed in an internal kneader in the proportions stated in Table 1 with 2 parts by weight of ethylenediamine bisstearylamide and 0.1 parts by weight of a silicone oil and, once pelletised, processed into test bars and a flat sheet (for evaluation of surface and contrast ratio, dimensions 60×40×2 mm).

The following data are determined:

notched impact strength at room temperature (ak(RT)) according to ISO 180/1 A (unit: $kJ/m^2$), surface gloss according to DIN 67 530 at a reflection angle of 200 (reflectometer value), yellowness index (YI) according to ASTM standard D 1925 (illuminant: C; observer: 2°; measurement opening: large area value) in accordance with the equation YI=(128X−106Z)/Y, where X, Y, Z are color coordinates to DIN 5033, contrast ratio (CR) as a measure of the opacity of the material by measuring a sample against a black background and against a white background according to $$CR = \frac{Y(\text{against a black background})}{Y(\text{against a white background})} \times 100$$

wherein Y describes the standard tristimulus value from the ClElab color space with illuminant D 65 and 10° observer (c.f. DIN 5033, Ulbricht sphere). Measurement was performed using a Dataflash SF 600 plus CT spectrophotometer.

Processability of the molding compositions was assessed by measuring injection pressure at 240° C. (unit: bar) (c.f. S. Anders et al., Kunststoffe 81 (1991), 4, pp. 336–340 and literature cited therein). Table 2 summarizes the results.

It is clear from Table 2 that the molding compositions according to the invention exhibit distinctly reduced opacity values and yellowness index (YI) values. Other important properties, such as for example notched impact strength or melt-processability are also improved or are not impaired.

TABLE 1

Compositions of the tested molding compositions

| Example | A1 pbw | A2 pbw | B1 pbw | B2 pbw | C1 pbw |
|---|---|---|---|---|---|
| 1 | — | 5 | 5 | — | 90 |
| 2 | — | 10 | 10 | — | 80 |
| 3 | 4.3 | — | — | 5 | 90.7 |
| 4 | 8.6 | — | — | 10 | 81.4 |
| 5 (Comparison) | — | 10 | — | — | 90 |
| 6 (Comparison) | — | — | 10 | — | 90 |
| 7 (Comparison) | — | — | — | — | 100 |

TABLE 2

Test data for the investigated compositions

| Example | $a_k$RT (kJ/m$^2$) | Injection pressure (bar) | Gloss | YI | CR (%) |
|---|---|---|---|---|---|
| 1 | 36 | 217 | 64 | 24 | 73 |
| 2 | 41 | 226 | 61 | 25 | 77 |
| 3 | 38 | 217 | 75 | 22 | 74 |
| 4 | 43 | 223 | 62 | 25 | 77 |
| 5 (Comparison) | 39 | 220 | 63 | 29 | 80 |
| 6 (Comparison) | 37 | 234 | 48 | 27 | 78 |
| 7 (Comparison) | 24 | 226 | 59 | 20 | 80 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition containing
   A) at least one graft rubber that is a product of free-radical emulsion polymerization of at least one vinyl monomer in the presence of at least one rubber a) that is present in latex form and having a glass transition temperature below 0° C., using at least one peroxydisulfate compound as an initiator,
   B) at least one graft rubber that is a product of free-radical emulsion polymerization of at least one vinyl monomer in the presence of at least one rubber b) that is present in latex form and having a glass transition temperature below 0° C., using at least one redox system as an initiator, and
   C) at least one graft polymer, that is a product of solution, bulk or suspension polymerization of a grafted phase that contains at least one member selected from the group consisting of styrene and acrylonitrile in a weight ratio of 90:10 to 50:50 therebetween, in the presence of a rubber, and wherein the weight ratio of graft monomers to rubber is 50:50 to 97:3.

2. The composition of claim 1 wherein grafted phase further contains at least one member selected from the group consisting of α-methylstyrene, methyl methacrylate and N-phenylmaleimide.

3. The composition of claim 1 wherein C) is characterized in that the rubber contains 0 to 50 wt. % relative to its weight of a copolymerized vinyl monomer.

4. The composition according to claim 1 additionally containing a rubber-free thermoplastic vinyl polymer as component D) and/or a thermoplastic resin other than one synthesized from vinyl monomers.

5. The composition according to claim 4 wherein thermoplastic resin other than one synthesized from vinyl monomers is at least one member selected from the group consisting of aromatic polycarbonate, aromatic polyester carbonate, polyester and polyamide.

6. The compositions according to claim 1 wherein the total weight of A and B is 1 to 50 parts by weight and the weight of C) is 50 to 99 parts by weight.

7. The composition according to claim 1 wherein the total weight of A and B is 2.5 to 45 parts by weight and the weight of C) is 55 to 97.5 parts by weight.

8. The compositions according to claim 1 wherein
   A) is at least one graft rubber that is a product of free-radical emulsion polymerization of styrene and acrylonitrile in a weight ratio of 90:10 to 50:50 therebetween, in the presence of at least one butadiene rubber present in latex form, using at least one peroxydisulfate compound as initiator, and
   B) is at least one graft rubber that is a product of free-radical emulsion polymerization of styrene and acrylonitrile in a weight ratio of 90:10 to 50:50 therebetween, in the presence of at least one butadiene rubber present in latex form, using at least one redox system as initiator, and
   C) is at least one graft polymer that is a product of solution, bulk or suspension polymerization of styrene and acrylonitrile in a weight ratio of 90:10 to 50:50 therebetween in the presence of a rubber and wherein the weight ratio of graft monomers to rubber is 70:30 to 95:5, and optionally
   D) at least one thermoplastic, rubber-free copolymer of styrene and acrylonitrile in a weight ratio of 90:10 to 50:50 therebetween.

9. The composition according to claim 1 wherein redox system, the oxidizing agent is at least one member selected from the group consisting of di-tert.-butyl peroxide, cumene hydroperoxide, dicyclohexyl percarbonate, tert.-butyl hydroperoxide, p-menthane peroxide and $H_2O_2$, and wherein the reducing agent is at least one member selected from the group consisting of salts of sulfinic acid, salts of sulfurous acid, sodium dithionite, sodium sulfite, sodium hyposulfite, sodium hydrogensulfite, ascorbic acid and the salts thereof, sodium formaldehydesulfoxylate, mono- and dihydroxyacetone, sugars, glucose, dextrose, iron(II) salts, tin(II) salts and titanium(II) salts.

10. The composition according to claim 1 wherein the rubber latices of graft rubbers A) and B) have monomodal particle size distributions.

11. The composition according to claim 1 wherein the rubber latices of graft rubbers A) and B) have bimodal particle size distributions.

12. The composition according to claim 1 wherein the latex of graft rubber A) has a monomodal particle size distribution and the latex of graft rubber B) has a bimodal particle size distribution.

13. The composition according to claim 1 wherein the rubber latex of graft rubber A) has a monomodal particle size distribution and the rubber latex of graft rubber B) has a trimodal particle size distribution.

14. The composition according to claim 1 wherein the rubber latex of graft rubber A) has a bimodal particle size distribution and the rubber latex of graft rubber B) has a trimodal particle size distribution.

15. The composition according to claim 1 wherein the rubber latex of graft rubber A) has a bimodal particle size distribution and the rubber latex of graft rubber B) has a monomodal particle size distribution.

16. The composition according to claim 1 wherein the rubber latex of graft rubbers A) and B) have median particle diameters ($d_{50}$) of 50 to 600 nm.

17. The composition according to claim 16 wherein median particle diameters ($d_{50}$) are 100 to 500 nm.

18. The composition according to claim 1 wherein the median particle diameter ($d_{50}$) of the rubber latex of graft rubber A) is less than the median particle diameter ($d_{50}$) of the rubber latex of graft rubber B).

19. The composition according to claim 1 wherein the rubber of component C) has a median particle diameter of 100 to 10000 nm.

20. The composition according to claim 19 wherein the median particle diameter is 200 to 5000 nm.

21. The composition according to claim 19 wherein the median particle diameter is 400 to 2000 nm.

22. A process for the production of a thermoplastic molding composition comprising mixing
- A) at least one graft rubber that is a product of free-radical emulsion polymerization of at least one vinyl monomer in the presence of at least one rubber a) that is present in latex form and having a glass transition temperature below 0° C., using at least one peroxydisulfate compound as an initiator, with
- B) at least one graft rubber that is a product of free-radical emulsion polymerization of at least one vinyl monomer in the presence of at least one rubber b) that is present in latex form and having a glass transition temperature below 0° C., using at least one redox system as an initiator, and with
- C) at least one graft polymer, that is a product of solution, bulk or suspension polymerization of a grafted phase that contains at least one member selected from the group consisting of styrene and acrylonitrile in a weight ratio of 90:10 to 50:50 therebetween, in the presence of a rubber, and wherein the weight ratio of graft monomers to rubber is 50:50 to 97:3.

23. A method of using the composition of claim 1 comprising producing a molded article.

24. A molded article comprising the composition of claim 1.

* * * * *